United States Patent Office 3,151,085
Patented Sept. 29, 1964

3,151,085
METHOD FOR THE PREPARATION OF METAL OXIDE SOLS
Jean G. Smith and Frederick T. Fitch, Baltimore, Md., assignors to W. R. Grace & Co., New York, N.Y., a corporation of Connecticut
No Drawing. Filed May 12, 1960, Ser. No. 28,512
5 Claims. (Cl. 252—301.1)

This invention relates to the preparation of sols of metal oxides useful as fuels in liquid homogeneous reactors. In one particular embodiment the invention relates to a method of preparing stable sols of thoria or urania containing dense spherical particles by the hydrolysis of a reagent that releases ammonia in a solution of soluble salts of these metals.

Aqueous homogeneous reactors may be one of three types: Burner reactors, converter reactors or breeder reactors. Burner reactors are those in which fissionable materials are consumed as fuels but virtually no fuel is generated. Converter reactors are those which produce a different fissionable fuel from that which is destroyed in the fission process. Breeder reactors are those which produce more of the same type of fissionable fuel as is being consumed in the reactor.

The nuclear reactions involved in aqueous homogeneous reactors of the latter type are well known. A typical example is a two region reactor using a mixed thoria-urania sol as a fuel. In this reactor a core of uranium solution is surrounded by a blanket of thorium 232. As the uranium in the core fissions, it gives off neutrons, some of which are absorbed by the thorium 232 to convert it to thorium 233. Thorium 233 decays with a half life of 23.3 minutes to yield protactinium 233 which in turn decays to uranium 233. Uranium 233 is a fissionable uranium isotope and is itself a suitable fuel. These breeder reactors may also be designed as single region reactors which contain a homogeneous mixture of fissionable and fertile materials in a moderator. These reactors differ from the single region reactors in that they have larger reactor diameters in order to minimize neutron losses.

Aqueous homogeneous reactors have several advantages over conventional type reactors used in nuclear power development. Briefly, these advantages reside in a higher power density than is available in a heterogeneous reactor, the ease with which fuel can be added to and fission products removed from the reactor system, and the wide size latitude an aqueous homogeneous reactor system allows, thereby making possible reactors which range in size from very small units to reactors large enough to be utilized in nuclear power plants.

Some of the prior art systems depended on the use of uranyl sulfate or uranyl phosphate in acid solution as a fuel in the aqueous homogeneous reactors. These reactor systems were not particularly satisfactory because both the sulfuric acid and phosphoric acid systems exhibited a definite tendency toward corroding the equiment. Solids tend to be deposited from these systems at the temperatures and concentrations required in aqueous homogeneous reactors.

Because of these disadvantages, considerable effort was expended toward preparing blanket fuel systems which comprise solids such as $ThO_2$–$UO_2$ which were placed in the reactor in slurry form. These slurries had several obvious disadvantages such as the erosion of the equipment and attrition of the materials themselves.

It has been recognized that these problems can be solved by using sols of urania, thoria or thoria-urania as fuels in aqueous homogeneous reactors. These types of sols have the advantage of being homogeneous particles of colloidal size and have been found to avoid the disadvantages that are present when thoria or urania slurries are used. There is, for example, no need to furnish agitation to prevent solids separation. These particles are not subject to attrition and because of the small particle size of the sols the problem of erosion of equipment is not significant.

The method of preparing metal oxide sols which are useful as fuels in aqueous homogeneous reactors and which may be coated with silica or used as an uncoated sol has been disclosed previously.

These sols are stable at the extreme hydrothermal operating conditions of the reactor when the desired particle structure is obtained, that is, a dense relatively spherical particle 40 to 400 m$\mu$ in diameter in sols that are substantially free of electrolytes. Such sols have viscosities almost the same as water. Higher viscosities are indicative of failure to accomplish these objectives.

By utilizing the process of our invention, it is possible to prepare a metal oxide sol, such as a thoria sol, urania sol or mixed thori-urania sol, of suitable metal oxide content which is free from neutron capturing components and is stable at the operation temperatures of aqueous homogeneous reactors. The sols thus formed exhibit the desirable characteristics previously described, that is, suitable density, good sphericity and little tendency to settle.

In cases where the sols are to be utilized as fuels for equeous homogeneous reactors, the sols can be coated with silica or some other suitable material to improved their hydrothermal stability. Briefly, the process of coating comprises the addition of a layer of reactive silica to the sol particles followed by stabilization through addition of an alkali metal hydroxide and autoclaving at 150°. The silica and alkali metal have low neutron capture cross-sections and do not interfere with the nuclear reactions in the aqueous homogeneous reactor. In order to obtain the desired characteristics, the cladding step must be carried out in a carefully controlled manner and under carefully controlled conditions.

We have found that metal oxide sols such as urania or thoria sols which are useful as fuels in aqueous homogeneous reactors can be prepared in a simple and convenient process which comprises treatment of soluble salts of the metal with homogeneous hydrolytic chemical agents under closely regulated conditions. The recognition and application of these conditions is an essential feature of this invention.

Urea is the preferred hydrolytic agent but other compounds capable of releasing ammonia slowly such as, for example, ammonium carbamate, potassium cyanate, hexamethylene, tetramine, acetamide and formamide may be used. In the processes described in the prior art, hydrolysis has been effected by anion removal. In the process of our invention the salt solution is essentially neutralized with sol formation occurring in the presence of the resulting electrolyte. The sol is purified in the later stages of the process. The process involves four steps as follows: (A) Hydrolysis; (B) Decantation; (C) Dispersion; (D) Deionization. The product sol recovered from this process has particles that are particularly dense, large and uniform in size and shape. These characteristics are generally superior to those obtained by physical methods. An important advantage of our process resides in its simplicity which provides an excellent opportunity to closely regulate the characteristics of the final product.

The use of urea in thoria purification is not new. For that matter, urea could very well be called a classical precipitant for thoria. It has been used primarily for the separation of thoria from the rare earths. The processes disclosed in the prior art have not considered the preparation of sols with urea or recognized the particle structures that can be accomplished when the process is operated under carefully controlled conditions.

In the first step of the reaction the hydrolysis is accomplished by controlled addition of urea in slight excess of the stoichiometric amount to a boiling solution of the salts of the metals. The reaction is carried out under reflux conditions, both for densification of the sol and for urea hydrolysis at the desired rate. Refluxing is continued until the deposition of the oxide is just complete. This point is characterized by a rapid pH rise. When the hydrolysis of the salt is complete as evidenced by the final sharp pH rise, the hydrolysis is terminated by cooling. When a thoria sol is being prepared, the sol may flocculate before sol formation is complete when the sol contains more than 2.5% thoria. This flocculation is not particularly disadvantageous because the sol can be redispersed easily by allowing the particles to settle, decanting the supernatant liquid and redispersing in fresh deionized water. The final purification step is carried out by passing the sol through an ion exchange resin to remove electrolytes.

The process for preparation of urania is essentially the same as that for thoria. Incremental addition following a large initial addition of the urea to the solution of the uranium salt seems to give better results. In the operation of the process, the initial pH of the system is made very acid, generally about 0.1. As the precipitation of the urania progresses, the pH rises and at a pH of about 0.4 the sol formation is well under way. Sol formation is complete by the time the pH of the solution has risen to the pH of about 1.0. The sol formation is stopped using the same technique as described in the thoria sol preparation. The conditions for urania sol preparation must be controlled much more rigorously than for thoria sol preparation in that if the pH is allowed to rise above 2, irreversible flocculation occurs very rapidly. The sol cannot be redispersed by peptizing with acid as readily as a thoria sol. The other steps in the process are essentially the same. The sol particles are allowed to settle, the supernatant liquid decanted and the sol redispersed in deionized water. The final purification is effected by passing the sol through an ion exchange resin.

The mode of urea addition is quite important in the preparation of these sols. Thoria particles with the best characteristics as to size and spherical shape and particle integrity were obtained, for example, when the urea was added in increments to a thorium salt solution containing the equivalent of 5% $ThO_2$. If the solution of thorium salt is more dilute, that is, when the thorium present as $ThO_2$ does not exceed 1%, the urea may be added all at once. When incremental addition is used, the urea is advantageously added in about 20 equal hourly increments. We have found that interrupting the reaction during the later stage of the hydrolysis is essential to good particle formation. If the hydrolysis is allowed to go about ¾ of the way to completion and is interrupted at that point, slowly cooled to room temperature and then reheated, a sol with very desirable characteristics results.

Control of the temperature during the hydrolysis reaction is very important. Reflux conditions must be maintained to insure proper sol formation. The slurry is stirred sufficiently only when the system is actually boiling. We found that if the temperature were allowed to drop for any appreciable period of time, a material was produced which was redispersible only after refluxing with nitric acid. If the temperature drop was prolonged, the thoria or urania tended to deposit on the walls of the reaction vessel.

Another of the variables that must be carefully controlled is the pH. In the process for the preparation of thoria sols we found that the pH must be kept in the range of 2.5–3.5. In any event, the end pH must be kept well below pH 5 if flocculation is to be avoided. The urania process is operated under more acid conditions. The uranium chloride solution is adjusted to a pH of about 0.1. A deposition of the urania sol starts at a pH of about 0.4 and ends at a pH of approximately 1.0.

In the examples set out in our invention, the growth of the thoria sol particles in the course of the sol formation was followed by an electron microscope. The formation of spherical particles in the size range of 20–40 $m\mu$ was observed during the initial stages. These particles subsequently aggregated and became rather large particles, that is, 50–200 $m\mu$. With optimum control of the hydrolysis conditions, the size range of these particles may be relatively narrow. Uniform shape and size of the particles is a contributing factor in the hydrothermal stability of the product sol.

After hydrolysis of the urea is complete, the ammonium salts formed must be removed in order to obtain a sol of desirable stability since sols of this type tend to coagulate in the presence of electrolytes. Electrolyte impurities, either from the hydrolysis or as contaminants, must be reduced to a low level before appreciable stability under extreme hydrothermal conditions can be achieved. The bulk of the ammonium salts released during hydrolysis may be removed by the flocculation method in which the sols are flocculated by the salts released during hydrolysis or, if necessary, by the addition of a small amount of an ammonium salt. After flocculation, the solids are allowed to settle and the supernatant liquid is removed. The solids are redispersed in deionized water. Finally, the salts must be removed to the desired low level either by ion exchange methods or by centrifuge methods.

A convenient method for determining the concentration of residual electrolytes is by measurement of specific conductance. For sols of the present invention the final specific conductance will generally be in the range of $10^{-6}$ to $10^{-2}$ mhos. The stability of any given sol is improved by reduction in ionic content; therefore, a specific conductance in the lower part of the range is preferred.

Specific conductance is measured at 25° C. and 1 kilocycle using a standard conductivity bridge with a cell inserted in one arm. The cell constant is determined using a KCl solution of 0.01 normality (the specific conductance of which is ascertained from conductivity tables) and using the equation:

$$K = L_{KCl} R$$

where $K$ = cell constant in cm.$^{-1}$
$R$ = bridge resistance in ohms
$L$ = conductance in mhos/cm. of the standard KCl solution The specific conductance L of the sol in question can be determined by measuring its resistance in the same cell and using the equation:

$$L_{sol} = \frac{K}{R}$$

where $K$ = cell constant
$R$ = resistance in ohms

The sols may be concentrated as desired by any of the standard techniques such as evaporation or centrifugation and redispersion. Where the metal oxide sol is to be used as a fuel in aqueous homogeneous reactors, concentration control is very important. Maximum concentration of the thoria or urania which may be obtained in the sol is primarily dependent on pH, conductance, particle size distribution, particle density and, when the sol is coated, the metal oxide to silica ratio.

The same steps of the process described above are applicable to preparation of sols from salts of thorium, uranium IV, uranium VI, plutonium, aluminum, zirconium, titanium, etc. Optimum conditions must be developed by experiment for each of the sols.

Electron micrographs were made using the standard techniques.

The present invention will be further explained by the following illustrative but non-limiting examples.

EXAMPLE I

A charge of 262 grams of thorium nitrate

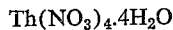

was dissolved in 1819 grams of water in a flask equipped with a thermometer, reflux condenser and a dropping funnel. A total of 56.8 grams of urea was dissolved in 181 grams of water and placed in the dropping funnel. This solution was added in 22 equal increments over a period of 21 hours to the thorium nitrate solution which had been heated to boiling under reflux conditions. The heating, accompanied by good stirring, was continued for 32 hours with overnight interruptions after 7, 14 and 23 hours. At the end of the 32 hour period the system had a pH of 5. Turbidity first appeared after 15 hours of refluxing and continued to develop rapidly and continuously for the balance of the heating period. The sol was flocculated in the course of preparation by the ammonium nitrate formed by hydrolysis of the urea. At the conclusion of the experiment the floc was allowed to settle, the supernatant liquid was drawn off and was replaced with deionized water. Upon stirring, the solid phase completely dispersed to form an opaque aquasol which scattered light very strongly. This product sol had a thorium oxide content of 4.2%, a pH of 5.4 and a specific conductance of $2.5 \times 10^{-5}$ mhos/cm. The electron micrographs of the sol showed it was composed of dense spherical particles, most of which were 70–105 m$\mu$ in size.

EXAMPLE II

Another 5% thorium oxide sol was prepared using the following technique. A total of 368 grams of solution prepared by dissolving hydrous thorium oxide in a slight excess of nitric acid and containing the equivalent of 34 grams of thorium oxide per 100 grams of solution was placed in a flask equipped with a reflux condenser, a dropping funnel and a thermometer. This solution, a total of 2500 grams, was heated to boiling under reflux conditions. The pH of this solution was found to be 0.95. The amount of urea necessary to hydrolyze the thoria was calculated and found to be 56.9 grams. A charge of 51.9 grams of urea was added initially to the boiling thorium nitrate solution and the balance was added after 10 hours. After 16 hours of heating the solution became turbid and turbidity continued to develop thereafter. After the solution had been heated for 22 hours with interruptions after 6, 10 and 15 hours, a 5.1 gram excess of urea was added. Light scattering measurements indicated the particle formation was complete after 30 hours of refluxing. This sol product was used to determine a suitable method of electrolyte removal.

EXAMPLE III

Electrolyte removal by centrifuging was investigated using a portion of the sol prepared in Example II. Approximately one third of the sol prepared in Example II was centrifuged once at 4000 r.p.m. for a period of 20 minutes. The supernatant liquid was removed and replaced by deionized water. The slurry was stirred to insure good contact of the sol particles with the water and centrifuged again at 10,000 r.p.m. This procedure was repeated twice more and the final product was removed and dispersed in deionized water. The pH of the product was checked and found to be 3.5. This sol product had a specific conductance of $5.4 \times 10^{-4}$ mhos/cm.

EXAMPLE IV

Another portion of the sol prepared in Example II was deionized using a different technique.

Approximately one third of the sol prepared in Example II was centrifuged once at 4000 r.p.m. for 20 minutes and the supernatant liquid removed. The liquid was replaced by deionized water and the resulting sol was passed through an ion exchange resin. The effluent of the resin column was checked and found to have a pH of 5.5 and a specific conductance of $1.8 \times 10^{-5}$ mhos/cm.

EXAMPLE V

The final portion of the sol prepared in Example II was deionized using still another method of removing contaminating electrolytes.

In this run approximately one third of the sol prepared in Example II was allowed to stand for a period of about 4 hours and decanted. The solids remaining were redispersed in deionized water and passed through an ion exchange resin column to remove electrolytes. The effluent of the column was checked and found to have a pH of 5.4 and a specific conductance of $2.0 \times 10^{-5}$ mhos/cm.

An examination of the data presented in Examples III, IV and V clearly indicates that any of these methods of ion removal give a satisfactory final product. Obviously the most convenient method of ion removal is the method set out in Example V. This sol was examined in the electron microscope and found to consist of discrete particles which were nearly spherical and had a size distribution from 20 to 150 m$\mu$ with the larger of the particles in the range of 80 to 150 m$\mu$.

EXAMPLE VI

Uranous oxide sols were prepared from aqueous uranous chloride solutions containing excess hydrochloric acid.

In a typical run 2500 g. of UCl$_4$ solution containing about 5% uranium calculated as UO$_2$, which was prepared by electrolytic reduction of uranyl chloride, was adjusted to a pH of 0.38 with HCl and placed in a flask equipped with a thermometer, a reflux condenser, a dropping funnel and provided with a means of maintaining a nitrogen atmosphere in the system at all times. The solution contained an excess of chlorine ions and had an initial pH of 0.1. A total of 14 grams of urea was dissolved in about 240 ml. of water and placed in a dropping funnel. This solution was added as follows: One half of the total urea was added as a solid at the start of the run and the rest was added in 24 equal increments over a period of 24 hours. The solution was kept at reflux temperature at all times and refluxing was carried out under an atmosphere of nitrogen. The reaction proceeded satisfactorily with sol formation starting as the pH rose to a pH of 0.4. The additions were continued until the pH rose to approximately 1.0. As in the thoria case, the completion of the sol formation was evidenced by a rapid rise in pH. When this rapid rise in pH was noted the run was discontinued and the product sol was allowed to settle, the supernatant liquid was removed and the sol redispersed in deionized water using the same techniques as described in Example I. The conditions of hydrolysis in similar runs and the properties of the product sol are set out in Table I below.

Stability tests on these coated sols were conducted as follows: A number of 3 to 5 ml. samples of the coated

*Table I*

| Run No. | Hydrolysis Conditions ||| Temp., °C. | Properties after deionization |||
|---|---|---|---|---|---|---|---|
| | Percent $UO_2$ | Initial pH | Mode of Urea Addition | | pH | Specific Conductance (mhos) × $10^{-4}$ | Electron micrograph data |
| 1 | 5 | 0.30 | Half initialy, half in 20 equal hourly increments. | 102 | 3.83 | 1.1 | Well formed aggregates of particles. Mean size 45 mµ. |
| 2 | 5 | 0.09 | 20 hourly increments | 100–102 | 4.58 | 0.46 | Roughly spherical aggregates of smaller particles. |
| 3 | 5 | 0.08 | Half initially, half in 20 hourly increments. | 101.5–102.5 | 4.70 | 21 | Aggregates of micro particles. Random aggregates. |
| 4 | 5 | 0.46 | Half initially, half in 20 hourly increments. | 101.5–102.5 | | | Aggregation of particles to form units with mean size of 35 mµ. |

EXAMPLE VII

An alumina sol was prepared from the hydrolysis of an aluminum nitrate solution with urea.

In a typical run an aluminum nitrate solution was prepared by dissolving 58.8 grams of $Al(NO_3)_3 \cdot 9H_2O$ in 650 ml. of water. The solution was heated to reflux temperature and 14 g. of urea in 240 ml. of $H_2O$ was added in 24 equal increments. The reaction proceeded similarly to the reaction of the hydrolysis of thorium nitrate described in detail in Example I except that aluminum ions apparently catalyze the hydrolysis of urea. The hydrolysis proceeded much more rapidly than in the thorium or uranium systems of the same concentration. The completion of hydrolysis was evidenced by a rapid pH rise as in the preparation of thoria and urania sols. When this pH rise became evident the hydrolysis was discontinued and the electrolytes were removed from the alumina sol by deionization through ion exchange resin. The effluent from the resin columns contained a turbidity which was dispersed by adjusting the pH to 5 with 2 normal nitric acid. The conditions of hydrolysis in two typical runs with properties of the product sol after deionization are set out in Table II below.

sols were sealed in Pyrex tubes having a capacity of about 10 ml. and were heated in a 100 ml. Aminco pressure bomb containing 30 to 40 ml. of water. Periodic inspections were made on the conditions of the samples. Following heating for the prescribed period of time, the physical condition of the sol was checked, the specific conductance and pH measured and an electron micrograph obtained on some of the samples to determine the effect on structure.

The properties of the sols, the test conditions and results of tests on a representative group of sols are presented in Table III below.

*Table III*

| Run No. | Diameter Range in Mµ | Sol Properties || Specific Conductance (mhos) × $10^{-4}$ | Test Conditions || Result |
|---|---|---|---|---|---|---|---|
| | | Density | pH | | Hours | Temp., °C. | |
| 1 | 50–110 | 1.47 | 8.65 | 5.6 | 393 | 275 | Stable. |
| 2 | 40–130 | 1.46 | 8.15 | 5.7 | 393 | 275 | Stable. |
| 3 | 60–120 | 1.51 | 8.2 | 6.7 | 393 | 275 | Stable. |
| 4 | 100–180 | 1.52 | 8.1 | 2.78 | 324 | 300 | Stable. |
| 5 | 100–180 | 1.50 | 7.9 | 3.52 | 300 | 300 | Stable. |
| 6 | 150–260 | 1.51 | 8.5 | 3.08 | 300 | 300 | Stable. |

*Table II*

| Run No. | Hydrolysis Conditions ||| Temp., °C. | Properties after deionization |||
|---|---|---|---|---|---|---|---|
| | Percent $Al_2O_3$ | Initial pH | Mode of Urea Addition | | pH | Specific Conductance (mhos) | Electron micrograph data |
| 1 | 1 | 3.6 | All initially | 100 | 7.25 | 1.5 × $10^{-5}$ | Elongated fibers in a gelatinous matrix. |
| 2 | 1 | 3.4 | All in 24 hourly increments | 100.5 | 5.2 | 6.1 × $10^{-6}$ | Do. |

EXAMPLE VIII

The use of the thoria and urania sols prepared by urea hydrolysis in nuclear reactors will require stability during several thousand hours operation with temperatures approaching 300° C. under heavy neutron flux. The thoria sols prepared were coated with silica and subjected to hydrothermal stability tests.

In a typical run, silica sol was used to coat the thoria sols. A silica sol was prepared by passing a nominal 2% sodium silicate solution through ion exchange resin. The effluent of the resin column contained 1.99% $SiO_2$ and no sodium. Two liters of the freshly prepared silica sol were mixed rapidly and with vigorous stirring into two liters of the deionized thoria sol described above. After this, an additional two liters of silica sol were added somewhat more slowly to give a final sol having a pH of about 3.5. A charge of 412 ml. of 1 normal sodium hydroxide was added to bring the pH up to 10. The entire system was refluxed for 24 hours at 100° C. The coated sol was then passed through a cation-anion resin and the pH of the effluent adjusted to pH 8.

It is apparent from an examination of these data that the sols prepared by urea hydrolysis can be clad with silica and that a clad sol, which is stable at temperatures of the order of 300° C. for approximately 400 hours, will result.

Obviously many modifications and variations of the invention as hereinabove set forth may be made without departing from the essence and scope thereof and only such limitations should be applied as are indicated in the appended claims.

What is claimed is:

1. A process for the preparation of an aqueous thoria sol which comprises the steps of preparing an aqueous solution of thorium nitrate, adding a quantity of urea about equal to the stoichiometric amount needed to effect hydrolysis, heating the solution to about 100° C. for about 20 hours while maintaining the pH in the range of 2.5 to 3.5, removing the electrolyte contaminants by centrifuging, redispersing and passing the resulting sol through an ion exchange resin and recovering the product thoria sol.

2. A process for the preparation of an aqueous alumina sol which comprises the steps of preparing a solution of aluminum nitrate, adding a quantity of urea in equal increments about equal to the amount stoichiometrically required to effect hydrolysis, heating the solution to about 100° C. for about 10 hours to effect hydrolysis, removing the electrolyte contaminants by ion exchange and recovering the product alumina sol.

3. A process for the preparation of an aqueous uranous oxide sol in which the uranium is in the plus IV oxidation state which comprises the steps of preparing a solution of uranous chloride adjusting the pH to 0.1, adding a quantity of urea about equal to the amount stoichiometrically required to effect hydrolysis, heating the solution to about 100° C. for about 20 to 35 hours, maintaining the pH between 0.1 and 1.0, removing the electrolyte contaminants by decanting the supernatant liquid, redispersing and passing the resulting sol through an ion exchange resin and recovering the product sol.

4. A process for the preparation of an aqueous thoria sol which comprises the steps of preparing an aqueous solution of thorium nitrate, adding a quantity of urea about equal to the stoichiometric amount needed to effect hydrolysis in 20 equal hourly increments, heating the solution to about 100° C. with interruptions after hydrolysis is ¾ of the way to completion, for about 20 hours while maintaining the pH in the range of 2.5 to 3.5, removing the electrolyte contaminants by settling and decantation, redispersing the solid phase, passing the resulting sol through an ion exchange resin and recovering the product sol.

5. A process for the preparation of an aqueous uranous oxide sol in which the uranium is in the plus IV oxidation state which comprises the steps of preparing a solution of uranous chloride adjusting the pH to 0.1, incrementally, adding a quantity of urea about equal to the amount stoichiometrically required to effect hydrolysis, heating the solution to about 100° C. while maintaining the pH between 0.1 to 1.0 for about 20 to 35 hours, removing the electrolyte contaminants by centrifuging and redispersing, passing the resulting sol through an ion exchange resin and recovering the product uranous oxide sol.

References Cited in the file of this patent

UNITED STATES PATENTS

| | | |
|---|---|---|
| 2,560,707 | Stark | July 17, 1951 |
| 2,590,833 | Bechtold et al. | Apr. 1, 1952 |
| 2,650,200 | Iler et al. | Aug. 25, 1953 |
| 2,754,270 | Kimberlin et al. | May 7, 1952 |
| 2,798,049 | White | July 2, 1957 |
| 2,885,366 | Iler | May 5, 1959 |

FOREIGN PATENTS

| | | |
|---|---|---|
| 609,216 | Great Britain | Sept. 28, 1948 |
| 663,013 | Great Britain | Dec. 12, 1951 |

OTHER REFERENCES

Thomas et al.: J.A.C.S., vol. 57, pp. 1821–1825 (1935).

Weiser: "Inorganic Colloid Chemistry," vol. II, pp. 104–120, 261, 262, 267–275, 321, 322 (1935).

Dobry et al.: J. de Chemie physique, vol 50, pp. 501–506 (1953).

AEC Document TID 11494, pp. 1–16, Final Report for January 1956 to June 1958.